US009046604B2

(12) United States Patent
Beth et al.

(10) Patent No.: US 9,046,604 B2
(45) Date of Patent: Jun. 2, 2015

(54) METHOD FOR MONITORING MOVEMENTS OF GROUND

(75) Inventors: Martin Beth, Venelles (FR); Fabien Ranvier, Vertaizon (FR); Eric Gastine, Paris (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 21 days.

(21) Appl. No.: 13/384,464

(22) PCT Filed: Jul. 7, 2010
(Under 37 CFR 1.47)

(86) PCT No.: PCT/FR2010/051425
§ 371 (c)(1),
(2), (4) Date: Jun. 4, 2012

(87) PCT Pub. No.: WO2011/010042
PCT Pub. Date: Jan. 27, 2011

(65) Prior Publication Data
US 2013/0011019 A1    Jan. 10, 2013

(30) Foreign Application Priority Data
Jul. 20, 2009 (FR) ...................................... 09 55037

(51) Int. Cl.
| | |
|---|---|
| *G06K 9/00* | (2006.01) |
| *G01S 13/89* | (2006.01) |
| *G01C 15/00* | (2006.01) |
| *H01Q 15/18* | (2006.01) |

(52) U.S. Cl.
CPC ................. *G01S 13/89* (2013.01); *G01C 15/00* (2013.01); *H01Q 15/18* (2013.01)

(58) Field of Classification Search
USPC .................................................. 382/100, 103
See application file for complete search history.

(56) References Cited

U.S. PATENT DOCUMENTS

| | | | | |
|---|---|---|---|---|
| 2002/0089442 | A1* | 7/2002 | Riemschneider et al. | ...... 342/15 |
| 2003/0135328 | A1* | 7/2003 | Burns et al. | ........................ 702/5 |
| 2003/0210180 | A1* | 11/2003 | Hager et al. | ................... 342/165 |
| 2006/0125713 | A1* | 6/2006 | Thevenot et al. | ............. 343/909 |
| 2012/0041705 | A1* | 2/2012 | Pillukat | ........................ 702/104 |

FOREIGN PATENT DOCUMENTS

| | | |
|---|---|---|
| GB | 2308033 A | 6/1997 |
| JP | 2001-091649 A | 4/2001 |
| WO | 98/02761 A1 | 1/1998 |

OTHER PUBLICATIONS

European Patent Office, International Search Report in International application No. PCT/FR2010/051425, dated Sep. 23, 2010.

* cited by examiner

*Primary Examiner* — Hadi Akhavannik
(74) *Attorney, Agent, or Firm* — Kenyon & Kenyon LLP

(57) ABSTRACT

A method of surveying movements of a terrain. The method may include the steps of providing the raw variations of the coordinates of a plurality of survey points situated on the terrain, and the raw variations of the coordinates of at least one reference point situated on the terrain; determining the real variations of the coordinates of said at least one reference point; and/or calculating corrected variations of the coordinates of the survey points. The method is performed on the basis of the raw variations of the coordinates of the survey points, of the raw variations of the coordinates of said reference point, and of the real variations of the coordinates of said reference point.

19 Claims, 4 Drawing Sheets

METHOD FOR MONITORING MOVEMENTS OF GROUND

CROSS REFERENCE TO RELATED APPLICATION

This is a 371 national phase application of International Application No. PCT/FR2010/051425, filed Jul. 7, 2010, claiming priority to French application No. 09-55037 filed Jul. 20, 2009, the contents of which are incorporated herein by reference in their entirety.

BACKGROUND OF THE INVENTION

The present invention relates to the field of surveying movements of terrain, such as a landslide, a collapse, a vertical deformation of the terrain, or any other type of terrain movement.

It is necessary to survey terrain movements in particular in order to prevent damage to a building or to engineering work built on terrain where work is taking place.

Such a movement of terrain may also be due to work being carried out underground in the terrain.

For example, a terrain may have a tendency to collapse during construction of an underground work, such as a tunnel or foundation, for example.

Traditionally, terrain movements are surveyed by using one or more theodolites that sight survey targets arranged on the terrain or on the work that it is desired to survey.

More recently, attempts have been made to use satellite images for surveying the movements of survey points located on the terrain.

To do this, an interferometric study is carried out on the basis of a plurality of radar images of the terrain and a digital terrain model (DTM) of the terrain that is to be surveyed, it being specified that such data is easily available commercially.

During the study, a plurality of survey points situated in the terrain are selected. Nowadays there exist several algorithms for selecting survey points that have the feature of being clearly visible in radar images.

The survey points are thus selected so as to return to the satellite an echo of intensity that is sufficient to be seen on each pass of the satellite.

Point interferograms are then calculated.

The result of the interferometric study thus makes it possible, for the zone under study, to obtain a list of survey points, their raw coordinates, and also the raw variation in their coordinates.

However, it is known that those results are generally noisy and of variable quality. In other words, the raw coordinates and the raw variations of the coordinates as obtained by that method are found to be relatively inaccurate and therefore difficult to make use of in their current state.

OBJECT AND SUMMARY OF THE INVENTION

An object of the present invention is to provide a method of surveying terrain movements that provide better accuracy.

The invention achieves this object by the fact that the survey method comprises:

a step of providing the raw variations of the coordinates of a plurality of survey points situated on the terrain, and the raw variations of the coordinates of at least one reference point situated on the terrain;

a step of determining the real variations of the coordinates of said at least one reference point; and a step of calculating corrected variations of the coordinates of the survey points, performed on the basis of the raw variations of the coordinates of the survey points, of the raw variations of the coordinates of said reference point, and of the real variations of the coordinates of said reference point.

In the invention, a reference point is a point for which coordinate variations are accurately known. These accurately known variations are therefore referred to as "real" variations, in contrast to "raw" variations, which are coordinate variations that are known to be inaccurate.

"Raw" variations correspond particularly but not exclusively to variations obtained from an interferometric study as described above.

A "real" variation may be determined by topography using one or more theodolites. Preferably, use is made of a plurality of reference points.

It is also specified that the present invention is strictly independent of the algorithm used for obtaining the raw variations of coordinates.

It should be added that the raw variations may come from data other than satellite data.

The raw coordinate variations are preferably provided periodically at a plurality of instants, these instants together constituting the duration of the study. The real variations of the coordinates of the reference points are determined at each of these instants.

Advantageously, the method of the invention also further comprises a step of determining the corrected temporal variation of at least one of the coordinates of at least one of the survey points.

In a preferred implementation, the corrected temporal variation of at least one of the coordinates of at least one of the survey points is the corrected variation of the altitude of said survey point.

It can thus be understood that the present invention makes it possible to represent the variation in altitude of the plurality of survey points. More precisely, the survey points are visualized by using the mean amount of movement of each survey point during the study period.

Advantageously, the survey method of the invention further includes a representation step of representing said temporal variation. In the meaning of the invention, this representation may be in the form of a data table, graphs, animations, contour lines, or in any other form of representation that enables an operator to become aware of the corrected variation over time of said coordinates.

Advantageously, during the representation step, the position of each of the survey points and the corrected variation of the altitude of each of the survey points are represented on a geographical or satellite map of a geographical information system.

The corrected variation of the altitude may for example be represented diagrammatically by a range of colors and/or by a graph showing the variation of the altitude of survey points over time.

Preferably, the step of calculating corrected variations of the coordinates of the survey points is performed using the variations of the raw and real coordinates of the reference points between two successive instants.

More precisely, the step of calculating corrected variations of the coordinates of the survey points implements an error distribution algorithm of the least-squares type. This incorporates data relating to the reference points.

The calculation consists in creating a surface from the altitude variations of the survey points. Thereafter, this surface is optimized by deforming it so that it fits as closely as possible to the real variations of the coordinates of the reference points.

In an advantageous implementation, the method of the invention further comprises:
- a step of providing the raw coordinates of said survey points and the raw coordinates of said at least one reference point;
- a step of determining the real coordinates of said reference point; and
- a step of calculating the corrected coordinates of said survey points performed on the basis of the raw coordinates of the survey points, of the raw coordinates of said reference point, and of the real coordinates of said reference point.

In other words, the reference point(s) is/are also used for correcting the coordinates of survey points. Knowing the real coordinates of the reference points and their raw coordinates as estimated in particular by interferometric methods, a correction is applied to all of the survey points, e.g. a shift in translation (suitable for passing from the raw coordinates to the real coordinates of the reference points), as a result of which the corrected coordinates of said survey points are obtained.

The coordinates of the survey points are preferably corrected only once at the beginning of the study, in particular when the method is used for surveying variation in the altitude of the survey points. This correction is performed essentially in order to obtain accurately the positions of the survey points, with altitude variation being given by the corrected variations of the coordinates.

Preferably, the raw variations of the coordinates and/or the raw coordinates are provided from an interferometric study based on a digital terrain model and a plurality of radar images taken by at least one radar image-taking device, preferably a satellite.

In an advantageous aspect of the invention, at least one of the survey points of the terrain includes at least one electromagnetic wave reflector for pointing towards said at least one satellite. The reflector makes it possible, where necessary, to improve the visibility of the survey point.

In another advantageous aspect of the invention, at least one of the reference points of the terrain includes at least one electromagnetic wave reflector for pointing towards said radar image-taking device. Here likewise, the reflector serves to improve the visibility of the reference point(s), or even to make visible a reference point having coordinates that are accurately known because, for example, it is known to be situated in a stable zone. It may happen that certain particularly advantageous reference points are nevertheless not naturally visible to the radar image-taking device. It can thus be understood that the invention makes it possible to take advantage of the "qualities" of these reference points by making them visible (or improving their visibility) in the radar images.

Preferably, the reflectors are steerable so that they can be pointed at satellites traveling on different orbits.

Concerning the determination of the real positions of the reference points, it is specified that the real coordinates of the reference points are preferably determined by global positioning system (GPS) measurements or by topography. In particular, it is possible to use theodolites for making topographic measurements. The variations of real coordinates are also preferably determined by topography.

The present invention also relates to a computer program including instructions for executing the steps of the survey method when said program is executed by a computer.

The program may use any programming language, and be in the form of source code, object code, or of code intermediate between source code and object code, such as in a partially complied form, or in any other desirable form.

The invention also provides a computer-readable recording medium having the computer program of the invention recorded thereon.

By way of example, the medium may be a hard disk, a compact disk read only memory (CD ROM), a floppy disk, or any other type of data medium capable of being situated in a local computer or in a remote server.

Finally, the invention provides the use of the method of the invention for surveying non-linear deformations of the terrain, of the kind that are liable to occur in particular when constructing an underground work, such as a tunnel, for example. The invention also makes it possible to survey linear deformations.

BRIEF DESCRIPTION OF THE DRAWINGS

The invention can be better understood on reading the following description given by way of non-limiting indication and made with reference to the accompanying drawings, in which.

DETAILED DESCRIPTION OF AN IMPLEMENTATION

Figure 1:
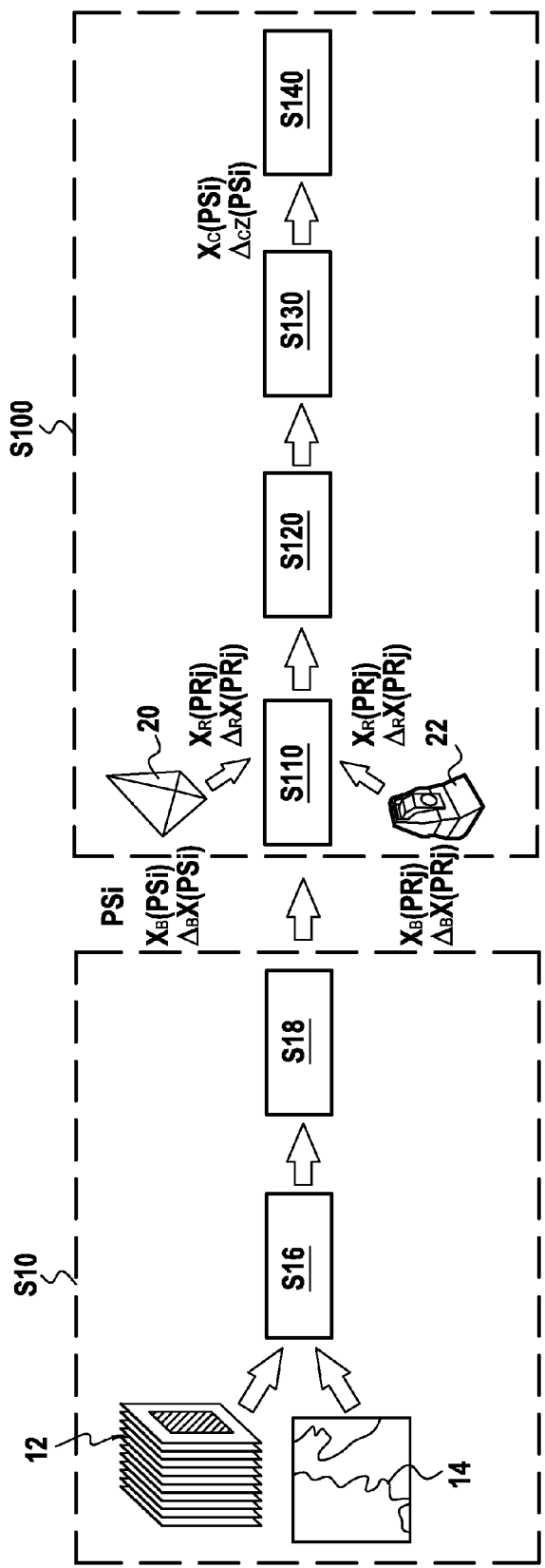
FIG. 1 is a diagram showing the steps of the survey method of the invention.

With reference to FIG. 1, there follows a description of the steps of an implementation of the survey method of the invention.

The method of the invention makes use of the variations over time in the raw coordinates of a plurality of survey points (PSI).

As mentioned above, the method of the invention is independent of the means or the algorithm used for obtaining these raw variations, it being specified that such means or algorithms are already known from elsewhere.

In this implementation, use is made of an interferometric process or study for the purpose of obtaining said raw variations, where such a process is known from elsewhere.

Before describing the interferometric process in detail, it is specified that in the meaning of the invention, a survey point is a zone on the ground that is a very good reflector of radar waves, and that has reflective characteristics that are preferably constant over time. This means that it is certain to be possible to detect and survey the movements of this survey point over time. By way of example, a survey point may be constituted by a building, a house roof, a bridge parapet, a pipeline, or any other reflecting structure.

The interferometric process corresponds to block S10 in FIG. 1. During this process, use is made of a plurality of radar images 12 of the terrain that is to be surveyed, it being specified that these images are taken by at least one satellite S at different instants. Conventionally, each radar image possesses an amplitude and a phase. Interferometry is based specifically on the phase differences between two radar images taken at two successive instants.

The process also requires a digital terrain model (DTM) 14 serving to eliminate the contributions of topography to the phase signal, and to create matrices for converting between the radar geometry and the geographical geometry.

This digital terrain model 14 covers the zone under study, i.e. the terrain that it is desired to survey.

Such a digital terrain model 14 is generally freely available on the Internet. By way of example, it is possible to choose the SRTM model.

During step S16, a list of survey points is determined together with their raw coordinates. The use of ENVISAT data makes it possible to obtain raw coordinates having accuracy lying in the range 5 meters (m) to 10 m.

Still during this step, matrices are calculated for converting from the raw coordinates of the radar images to raw geographical coordinates.

It is preferably the geographical coordinates that are used when implementing the method of the invention.

Thereafter, raw interferograms are calculated that are subsequently subjected to a step of resolving the components of the signal S18. This de-noising step consists in eliminating contributions other than those associated with movement of the ground, which parasitic contributions may be associated with topographical orbital problems or with variability in atmospheric components.

Thus, the interferometric process makes it possible, in the zone under study, to obtain a list of survey points $PS_i$, their raw coordinates $X_B(PS_i)$—where $X=(x,y,z)$—together with their raw coordinate variations $\Delta_B X(PS_i)$.

The steps of the survey method of the invention are described below in greater detail, these steps being grouped together in block 5100 of FIG. 1 and being based on the raw data supplied during the interferometric process S10.

In this example, the raw variation of coordinates that is of interest is the raw variation $\Delta_B z(PS_i)$ in the altitude $\underline{z}$ of each of the survey points, this altitude $\underline{z}$ preferably being considered in a vertical direction. In accordance with the invention, at least one (and preferably a plurality) of reference points $PR_j$ are also selected that are situated in the terrain, i.e. in the zone under study.

By way of example, a reference point $PR_j$ is a point situated on the ground and for which the variations of its coordinates over time are known accurately, or at least are capable of being known accurately. Usually, although not exclusively, the reference point $PR_j$ is located in a zone of the terrain that is stable, or at least in which movements are very small over time, or indeed in which any movements can easily be measured. In this implementation, a plurality of reference points $PR_j$ are used in order to improve measurement accuracy.

Figure 2:
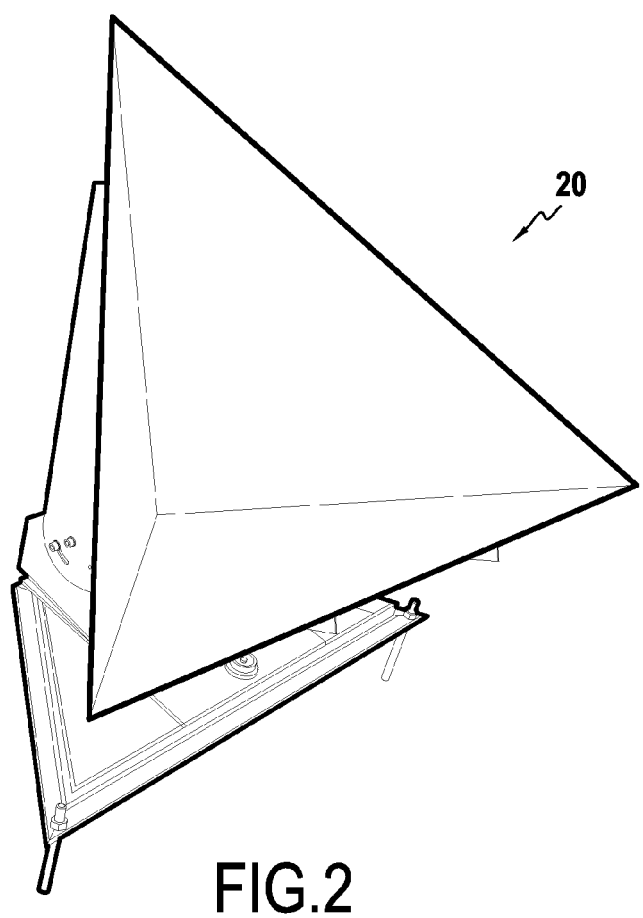
FIG. 2 is a perspective view of a radar wave reflector for positioning at a reference point.

In an advantageous aspect of the invention, some of the reference points $PR_k$ are fitted with respective radar wave reflectors 20, as shown in FIG. 2, if their natural electromagnetic wave reflectivities are not sufficient for those points to appear clearly in the radar images 12 taken by the satellite S. Each reflector 20 is aligned with the sighting axis A of the satellite S, as shown diagrammatically in FIG. 3.

The reflector 20 presents the feature of being pointable so as to be capable of being aligned with the sighting axes of satellites following different orbits. It is in the form of a trihedron having adjustable angles of inclination and azimuth. In this example, the satellite used is ENVISAT for which the sighting axis is at an angle of 23° relative to the vertical.

It can thus be understood that the above-described interferometric process also provides the raw coordinates $X_B(PR_j)$—where $X=(x,y,z)$—and the raw variations $\Delta_B X(PR_j)$ of the coordinates of the reference points $PR_j$.

In accordance with the invention, during step S110, the real variations $\Delta_R X(PR_j)$ of the coordinates of the reference points are determined as are the real coordinates $X_R(PR_j)$ of the reference points.

In this example, the real variations of the coordinates of the reference points and their real coordinates are determined by topographical measurements or by using a global positioning system (GPS). Preferably, these measurements are performed periodically, for example on each day that a radar image 12 is taken. Furthermore, the topographical measurements may be performed using one or more theodolites 22 sighting targets arranged at the reference points $PR_j$.

These measurements make it possible to calculate vectors representing the real variations in the coordinates of the reference points.

For those reference points $PR_k$ having real coordinates $X_R(PR_k)$ and real coordinate variations $\Delta_R X(PR_k)$ that are accurately known throughout the duration of the study, there is no need to take the above-mentioned periodic measurements. Such reference points $PR_k$ are usually reference points fitted with reflectors 20 and situated in zones in which the ground does not move.

Thereafter, a step S120 is performed of calculating the corrected coordinates $\Delta_C X(PS_i)$ of said survey points, with this being performed starting with the raw coordinates $\Delta_B X(PS_i)$ of the survey points, the raw coordinates $X_B(PR_j)$ of the reference points, and the real coordinates $X_R(PR_j)$ of the reference points.

To do this, the reference points are used to correct the raw coordinates of the survey points. The real coordinates of these reference points and their raw coordinates as estimated at the end of the interferometric process S10 are known. A correction is then calculated between the raw coordinates $X_B(PR_j)$ and the real coordinates $X_R(PR_j)$ of the reference points, e.g. a shift in translation, and that correction is then applied to the raw coordinates $X_B(PS_i)$ for all of the survey points, thereby obtaining the corrected coordinates $X_C(PS_i)$ of the survey points, thus making it possible significantly to improve the accuracy of their positions.

A step S130 is also performed of calculating corrected variations $\Delta_C X(PS_i)$ of the coordinates of the survey points, performed on the basis of the raw variations $\Delta_B X(PS_i)$ of the coordinates of the survey points, of the raw variations $\Delta_B X(PR_j)$ of the coordinates of the reference points, and of the real variations $\Delta_R X(PR_j)$ of the coordinates of the reference points.

To do this, the time at which the oldest of the radar images 12 was taken is used as a reference time. The coordinate variations are thus relative to that time, and also to one of the reference points.

For each radar image 12 taken by the satellite S, an error distribution algorithm of the least-squares type is implemented incorporating the real coordinates of the reference points. This algorithm is applied to the coordinate variations between two radar images. In this example, the calculation step S130 for providing the corrected coordinate variations at the current instant is applied between the time of the second radar image and the current instant, where the second radar image is such that it was taken after the radar image that was taken at the time used as a reference.

Figure 3:
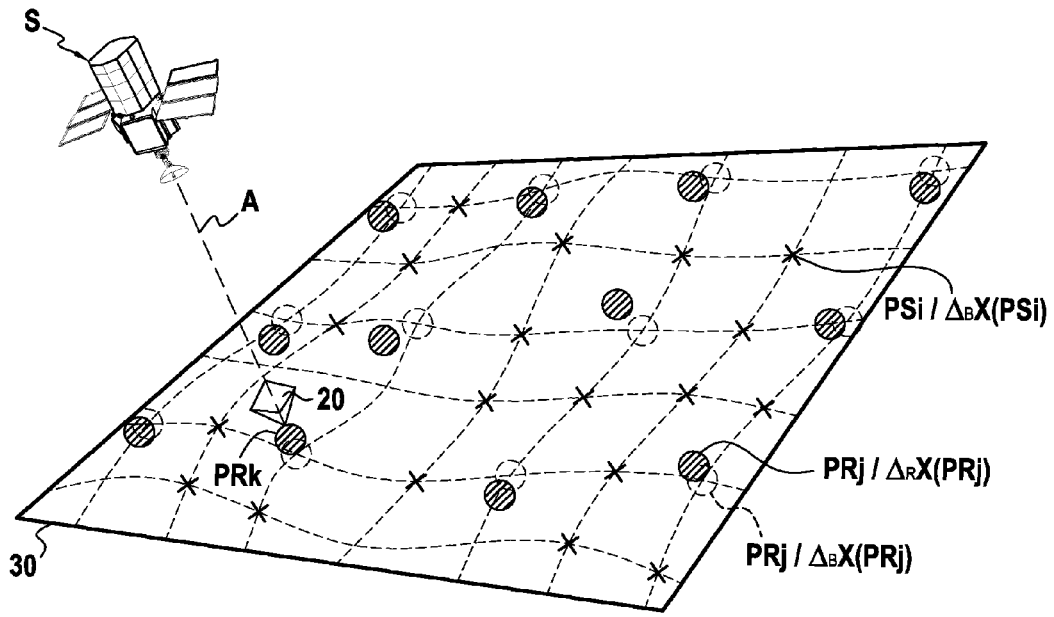
FIG. 3 shows a raw surface obtained from raw variations of the coordinates of survey points, and also the real variations of the reference points.

It is specified that the calculation here consists in creating a mathematical surface 30 represented in dashed lines in FIG. 3 on the basis of the raw variation in the altitudes of the survey points $\Delta_B z(PS_i)$ and of the reference points $\Delta_B z(PR_j)$. In this example, the other two coordinates (x,y) are of no interest insofar as the objective is to survey any settling of the ground.

Figure 4:
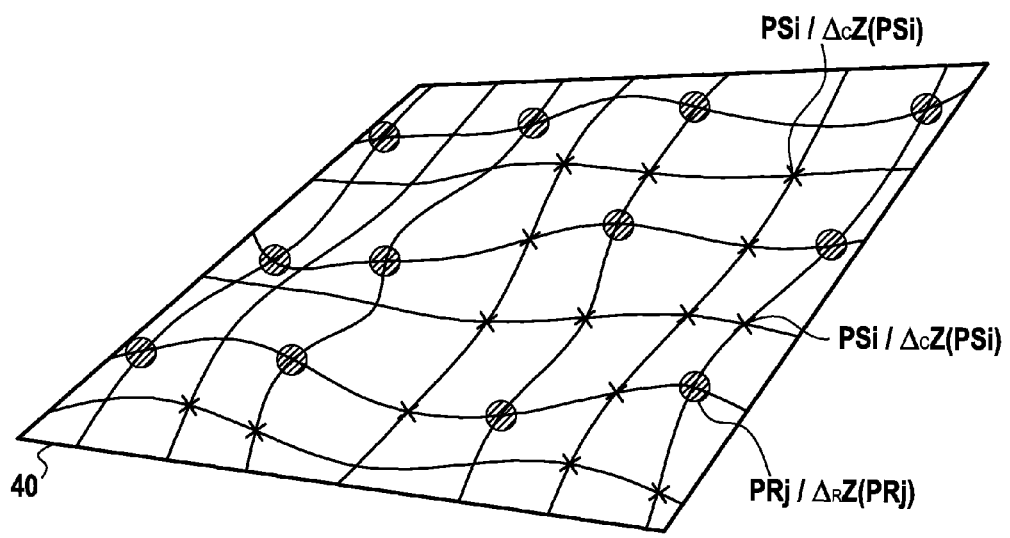
FIG. 4 shows a corrected surface obtained by deforming the raw surface of FIG. 3.

This surface 30 is then optimized by the above-mentioned algorithm by deforming it until it fits as closely as possible to the real variations $\Delta_R z(PR_j)$ of the altitudes of the reference points, after which a corrected surface 40 is obtained that is drawn in continuous lines in FIG. 4, providing the corrected variations $\Delta_C z(PS_i)$ of the altitudes of the survey points.

Without going beyond the ambit of the present invention, it is possible to calculate the real variations of the other two coordinates (x,y) of the survey points.

Figure 5:
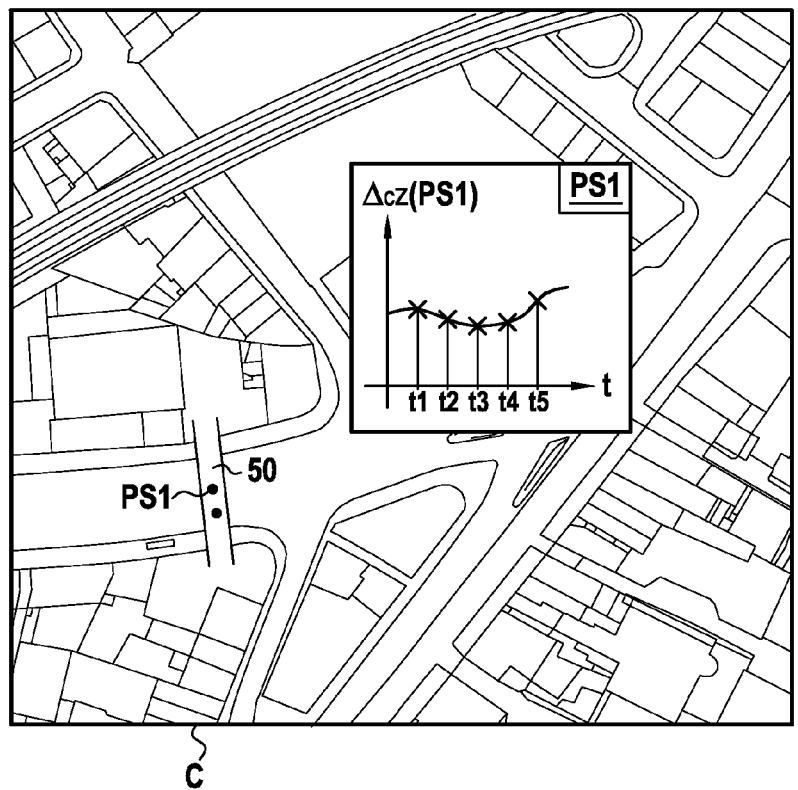
FIG. 5 shows the representation of two survey points after correction, together with the corrected variations in the altitude of one of them.

In accordance with the invention, a step S140 is performed of representing the variation over time of at least one of the corrected coordinates of one of the survey points $PS_1$. In this example, as illustrated in FIG. 5, the position of the survey point $PS_1$ and the corrected variation of its altitude are represented on a map C of a geographical information system. It is specified that this survey point $PS_1$ is positioned on the basis of its corrected coordinates.

Figure 6:
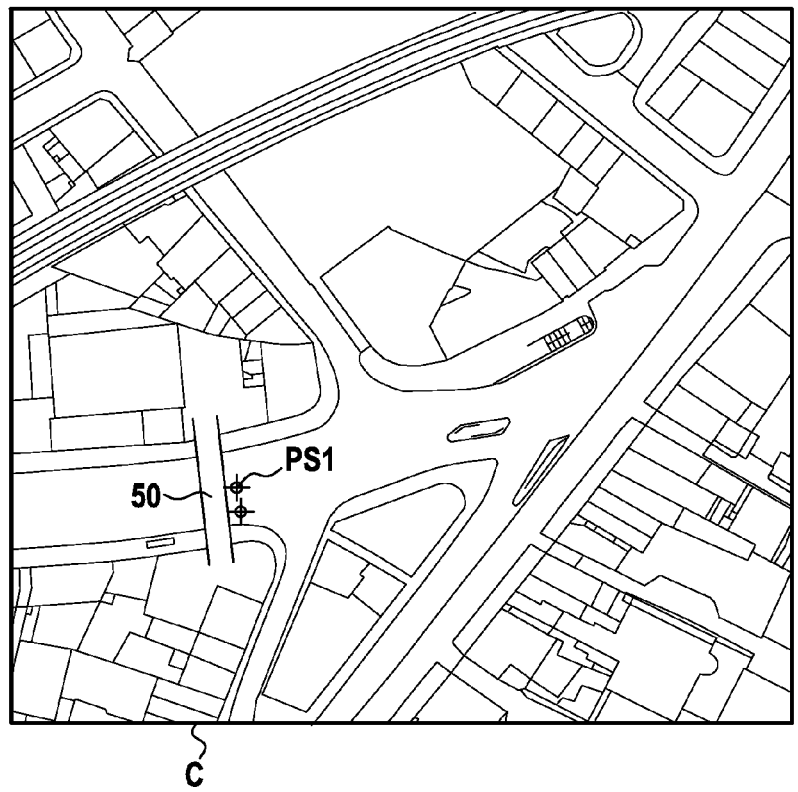
FIG. 6 shows the representation of two survey points for which the raw coordinates have not been corrected.

FIG. 6 also shows, by way of information, the position of the same point $PS_1$ based on its raw coordinates. It can be seen that the survey point is wrongly positioned in the water, beside the bridge 50.

By selecting the point $PS_1$, the user obtains a graph showing the corrected variation of the altitude $\Delta_C z(PS_1)$ of the point $PS_1$ over time. A color code may also be used in order to enable the user to visualize quickly on the map C, which of the survey points present the greatest variations of altitude at the current instant.

Figure 7:
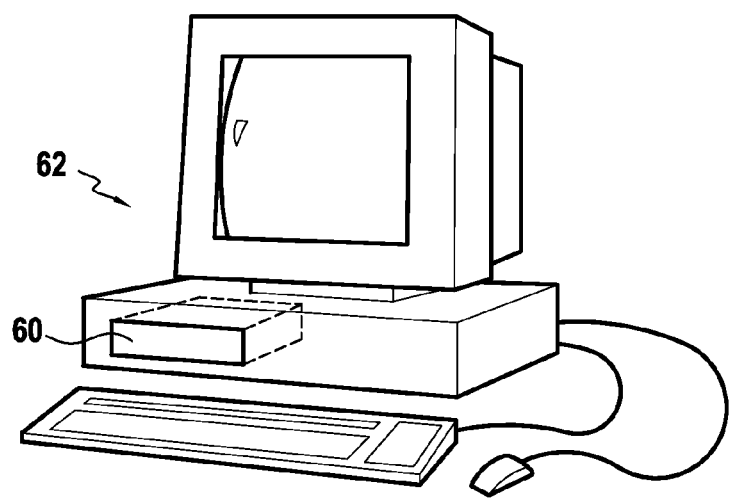
FIG. 7 shows a computer including a hard disk having stored thereon the computer program that implements the method of the invention.

The survey method of the invention is preferably presented in the form of a computer program including instructions in a standard programming language. In this example, the computer program is stored on a hard disk 60 of a computer 62, shown diagrammatically in FIG. 7.

This computer program, or a portion thereof, may be loaded in a server that is remotely accessible by a remote computer.

In particularly advantageous manner, this survey method makes it possible to detect any collapsing of terrain in which underground work is being performed, e.g. a tunnel. The deformations caused by building a tunnel is often non-linear, such that the algorithms that are presently in use, relying on linear regression, do not enable them to be detected.

The invention claimed is:

1. A method of monitoring soil deformation of a terrain between a first instant and a second instant, the method comprising:
   a step of providing the raw temporal variations of the coordinates of a plurality of survey points situated on the terrain between said first and second instants, and the raw temporal variations of the coordinates of at least one reference point situated on the terrain between said first and second instants;
   a step of determining the real temporal variations of the coordinates of said at least one reference point between said first and second instants;
   a step of calculating corrected temporal variations of the coordinates of the survey points, performed on the basis of said raw temporal variations of the coordinates of the survey points, of said raw temporal variations of the coordinates of said reference point, and of said real temporal variations of the coordinates of said reference point; and
   a representation step of representing the corrected temporal variations of at least one of the coordinates of the at least one of the survey points so as to monitor the movement of said at least one of the survey points between first and second instants.

2. The method monitoring soil deformation of a terrain according to claim 1, further comprising a step of determining the corrected temporal variation of at least one of the coordinates of at least one of the survey points.

3. The method of monitoring soil deformation of a terrain according to claim 2, wherein the corrected temporal variation of at least one of the coordinates of at least one of the survey points is the corrected temporal variation of the altitude of said survey point.

4. The method of monitoring soil deformation according to claim 2 further including a representation step of representing said temporal corrected variation of the altitude of said survey point.

5. The method of monitoring soil deformation of a terrain according to claim 4, wherein, during the representation step, the position of each of the survey points and the corrected temporal variation of the altitude of each of the survey points are represented on a geographical or satellite map of a geographical information system.

6. The method of monitoring soil deformation of a terrain according to claim 1, wherein the step of calculating corrected variations of the coordinates of the survey points is performed using the temporal variations of the raw and real coordinates of the reference points between two successive instants.

7. The method of monitoring soil deformation of a terrain according to claim 1, wherein the step of calculating corrected variations of the coordinates of the survey points implements an error distribution algorithm of the least-squares type.

8. The method of monitoring soil deformation of a terrain according to claim 1, further comprising:
   a step of providing the raw coordinates of said survey points and the raw coordinates of said at least one reference point;
   a step of determining the real coordinates of said reference point; and
   a step of calculating the corrected coordinates of said survey points performed on the basis of the raw coordinates of the survey points, of the raw coordinates of said reference point, and of the real coordinates of said reference point.

9. The method of monitoring soil deformation of a terrain according to claim 8, wherein the raw temporal variations of the coordinates and/or the raw coordinates are provided from an interferometric study based on a digital terrain model and a plurality of radar images taken by at least one radar image-taking device.

10. The method of monitoring soil deformation of a terrain according to claim 9, wherein at least one of the survey points of the terrain includes at least one electromagnetic wave reflector for pointing towards said at least one radar image-taking device.

11. The method of monitoring soil deformation of a terrain according to claim 9, wherein at least one of the reference points of the terrain includes at least one electromagnetic wave reflector for pointing towards said at least one radar image-taking device.

12. The method of monitoring soil deformation of a terrain according to claim 1, wherein the real coordinates of the reference points are determined by GPS measurements or by topography.

13. The computer program including instructions for executing the step of the survey method according to claim 1 when said program is executed by a computer.

14. A non-transitory computer readable medium having recorded thereon the computer program of claim 13.

15. The use of the method according to claim 1, for monitoring non-linear deformations of the terrain that are liable to occur in particular when building an underground structure.

16. The survey method according to claim 3, further including a representation step of representing said temporal variation.

17. The survey method according to claim 16, wherein, during the representation step, the position of each of the survey points and the corrected variation of the altitude of each of the survey points are represented on a geographical or satellite map of a geographical information system.

18. The survey method according to claim 10, wherein at least one of the reference points of the terrain includes at least one electromagnetic wave reflector for pointing towards said at least one radar image-taking device.

19. A method of monitoring soil deformation of a terrain, between a first instant and a second instant, the method comprising:

a step of providing the raw temporal variations of the coordinates of a plurality of survey points situated on the terrain between said first and second instants, and the raw temporal variations of the coordinates of at least one reference point situated on the terrain between said first and second instants;

a step of determining the real temporal variations of the coordinates of said at least one reference point between said first and second instants;

a step of calculating corrected temporal variations of the coordinates of the survey points, performed on the basis of said raw temporal variations of the coordinates of the survey points, of said raw temporal variations of the coordinates of said reference point, and of said real temporal variations of the coordinates of said reference point; and a representation step of representing the corrected temporal variation of at least one of the coordinates of the at least one of the survey points so as to monitor the movement of said at least one of the survey points between first and second instants; wherein said method comprises:

a step of providing the raw coordinates of said survey points and the raw coordinates of said at least one reference point;

a step of determining the real coordinates of said reference point; and a step of calculating the corrected coordinates of said survey points performed on the basis of the raw coordinates of the survey points, of the raw coordinates of said reference point, and of the real coordinates of said reference point, wherein the raw temporal variations of the coordinated and/or the raw coordinates are provided from an interferometric process based on a plurality of radar images taken by at least one radar image-taking device, and wherein the real coordinates of the reference points are determined by GPS movements of by topography.

* * * * *